US008494073B2

(12) United States Patent
Wang et al.

(10) Patent No.: US 8,494,073 B2
(45) Date of Patent: Jul. 23, 2013

(54) BEAMFORMING WEIGHT ESTIMATION USING WIDEBAND MULTIPATH DIRECTION OF ARRIVAL ANALYSIS

(75) Inventors: Genyuan Wang, Plano, TX (US); Li Guo, Irving, TX (US); Ahmadreza Hedayat, Allen, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 679 days.

(21) Appl. No.: 12/502,607

(22) Filed: Jul. 14, 2009

(65) Prior Publication Data

US 2011/0013711 A1    Jan. 20, 2011

(51) Int. Cl.
*H04L 1/02* (2006.01)
*H04M 1/00* (2006.01)

(52) U.S. Cl.
USPC ........... 375/267; 375/144; 375/260; 375/285; 375/219; 455/562.1

(58) Field of Classification Search
USPC ......................................... 375/260, 267, 285
See application file for complete search history.

(56) References Cited

U.S. PATENT DOCUMENTS

| | | | |
|---|---|---|---|
| 6,940,917 B2 * | 9/2005 | Menon et al. ................. | 375/267 |
| 7,310,538 B2 * | 12/2007 | Steele et al. ............... | 455/562.1 |
| 8,059,744 B2 | 11/2011 | Jin et al. | |
| 2008/0090575 A1 * | 4/2008 | Barak et al. ................... | 455/444 |

OTHER PUBLICATIONS

Shen et al., "Design Tradeoffs in OFDMA Uplink Traffic Channels," IEEE Trans. on Wireless Communications, 2004.

* cited by examiner

*Primary Examiner* — Shuwang Liu
*Assistant Examiner* — Ross Varndell
(74) *Attorney, Agent, or Firm* — Edell, Shapiro & Finnan, LLC (57) ABSTRACT

Techniques are provided for computing downlink beamforming weights based on the received data at a base station from a mobile station in a MIMO communication system. An uplink transmission is received at a plurality of antennas at a first communication device from a second communication device, where the uplink transmission comprises a plurality of uplink subbands. The uplink spatial signature is estimated for each of the plurality of uplink subbands. The uplink spatial signature is decomposed into a plurality of direction of arrival (DOA) components for each uplink subband using a transform. Data representing multiple propagation paths between the first communication device and the second communication device is computed for each DOA component. A plurality of direction of departure (DOD) components for each of a plurality of downlink subbands is computed based on the data representing the multiple propagation paths. A downlink spatial signature for each downlink subband from the plurality of DOD components is computed using an inverse of the transform. Downlink beamforming weights are computed for each of the plurality of downlink subbands based on the downlink spatial signature, where the downlink beamforming weights are for use by the first communication device when beamforming a downlink transmission via the plurality of antennas of the first communication device to the second communication device.

19 Claims, 8 Drawing Sheets

BEAMFORMING WEIGHT ESTIMATION USING WIDEBAND MULTIPATH DIRECTION OF ARRIVAL ANALYSIS

TECHNICAL FIELD

The present disclosure relates to wireless communication devices and systems and more particularly to beamforming in multiple-input multiple-output wireless communication systems.

BACKGROUND

In wireless communication systems, antenna arrays are used at devices on one or both ends of a communication link with multipath fading and interference, and to increase system capacity by supporting multiple co-channel users and/or higher data rate transmissions through the use of beamforming and/or multiple-input multiple-output (MIMO) techniques, which are emerging technologies used in newer wireless communication systems.

A base station equipped with an antenna array can improve downlink MIMO transmission performance by using uplink channel information from transmissions received from a mobile station. In general, the base station can only estimate, i.e., not determine with certainty, the downlink (DL) channel spatial characteristics from the uplink (UL) channel characteristics using spatial decomposition of UL transmissions because the spatial and frequency dependent aspects of the UL and DL channels are different. Current techniques for estimating DL channel information rely on narrow band direction of arrival (DOA) analysis in which the UL sub-channels at each DOA are analyzed as a single path or a flat fading channel to compute a direction of departure (DOD) for DL transmissions. These techniques have limitations when applied in a wideband communications system.

DESCRIPTION OF EXAMPLE EMBODIMENTS

Overview

Techniques are provided for computing downlink beamforming weights based on a transmission received at a base station from a mobile station in a multiple-input multiple-output (MIMO) communication system. An uplink transmission is received at a plurality of antennas at a first communication device from a second communication device, where the uplink transmission comprises a plurality of uplink subbands. The uplink spatial signature is estimated for each of the plurality of uplink subbands. The uplink spatial signature is decomposed into a plurality of direction of arrival (DOA) components for each uplink subband using a transform. Data representing multiple propagation paths between the first communication device and the second communication device is computed for each DOA component. A plurality of direction of departure (DOD) components for each of a plurality of downlink subbands is computed based on the data representing the multiple propagation paths. A downlink spatial signature for each downlink subband from the plurality of DOD components is computed using an inverse of the transform. Downlink beamforming weights are computed for each of the plurality of downlink subbands based on the downlink spatial signature, where the downlink beamforming weights are for use by the first communication device when beamforming a downlink transmission via the plurality of antennas of the first communication device to the second communication device.

Example Embodiments

Figure 1:
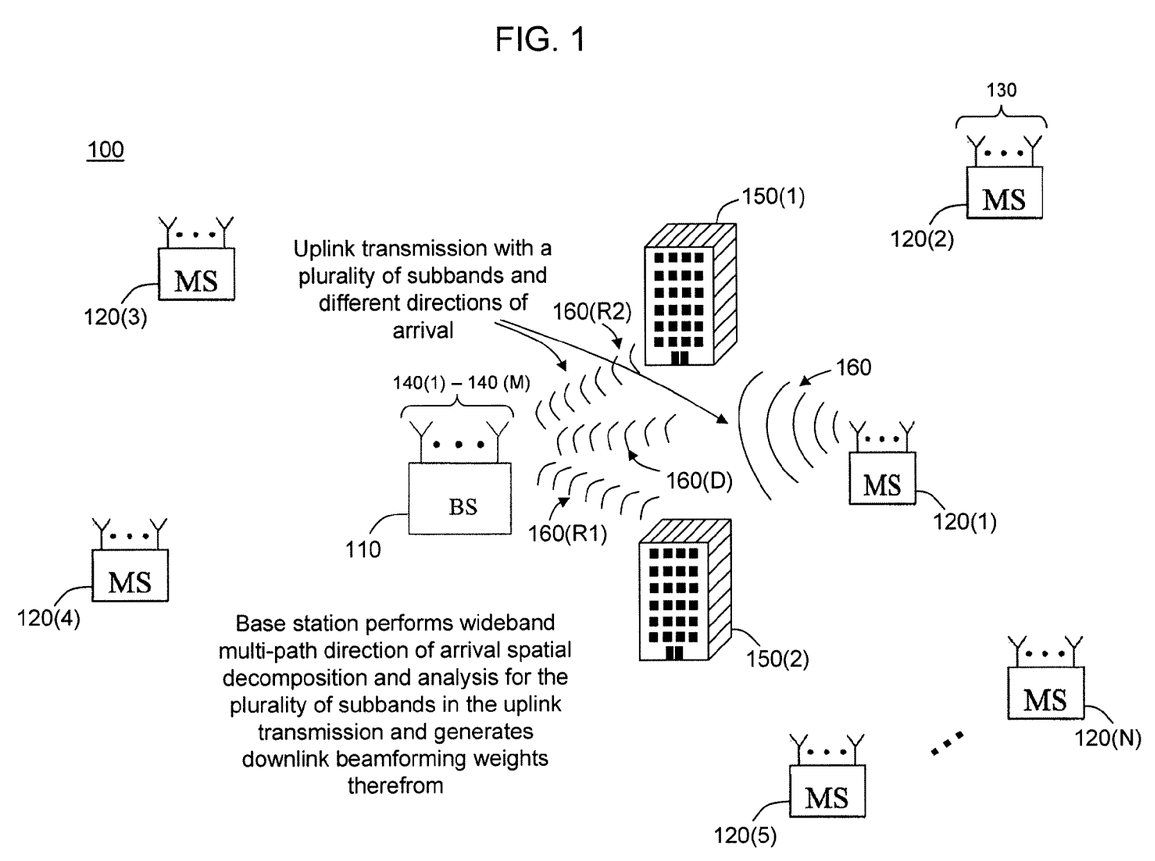
FIG. 1 is a block diagram showing an example of a wireless communication system in which a first communication device (e.g., base station) receives a wideband multipath transmission from a second device (e.g., mobile station).

Referring first to FIG. 1, a wireless radio communication system 100 is shown. The system 100 comprises a first communication device, e.g., a base station (BS) 110, and a plurality of second communication devices, e.g., mobile stations (MSs) 120(1)-120(N). The BS 110 may connect to other wired data network facilities (not shown) and in that sense serves as a gateway or access point through which the MSs 120(1)-120(N) have access to those data network facilities.

The BS 110 comprises a plurality of antennas 140(1)-140(M) and the MSs 120(1)-120(K) may also comprise a plurality of antennas 130 (shown only for MS 120(2)). The BS 110 may wirelessly communicate with individual ones of the MSs 120(1)-120(N) using a wideband wireless communication protocol in which the bandwidth is much larger than the coherent frequency bandwidth. Examples of such wireless communication protocols are IEEE 802.16 (commercially known as WiMAX®) and the 3 Generation Partnership Project (3GPP) Long Term Evolution (LTE).

The MS 120(1) transmits an uplink signal 160 to the BS 110, where the uplink signal comprises a plurality of subbands. Along the way the transmission 160 is reflected off various physical objects, e.g., buildings 150(1) and 150(2). The reflected signals, shown as 160(R1) and 160(R2), will take longer to reach BS 110 than the un-reflected or direct signal 160(D). The signals 160(R1), 160(R2), and 160(D), also arrive at BS 110 with different directions of arrival (DOAs) as shown. It will be appreciated that in some environments a direct signal will not be available and all of the signals received by the BS 110 will be reflected signals.

Although only two reflected signals are shown it is well-known that many such reflected signals are possible.

Techniques are provided herein to generate values for beamforming weights that a first communication device, e.g., the BS 110, uses for MIMO wireless communication to a second communication device, e.g., MS 120(1). The BS 110 computes the beamforming weights based on the uplink channel information from the MS 120(1), i.e., from signals 160(R1), 160(R2), and 160(D), using a wideband multipath DOA spatial decomposition and analysis for the plurality of subbands in signal 160. The techniques described herein improve the signal-to-noise ratio (SNR) and reduce the data transmission error.

Figure 2:
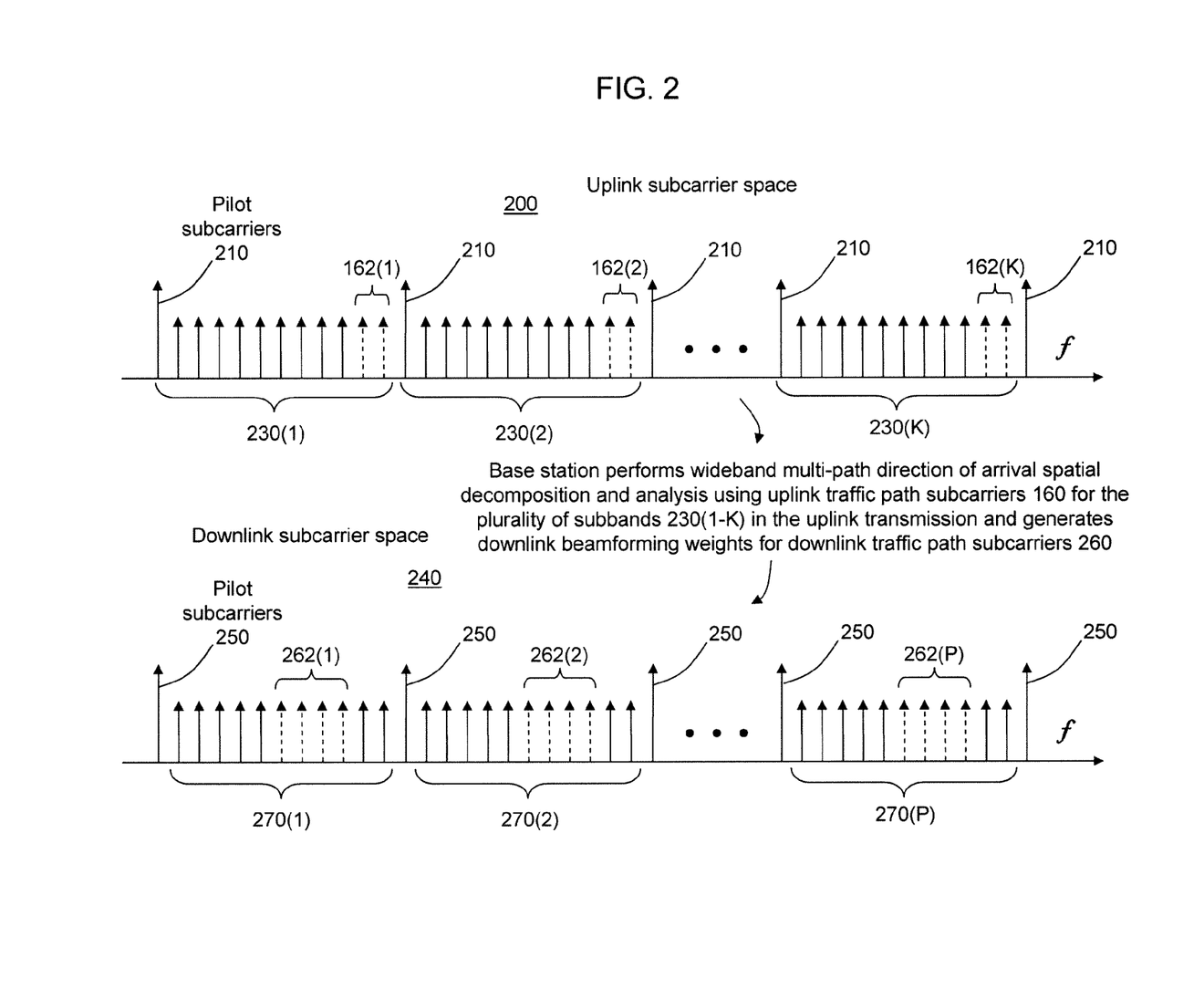
FIG. 2 is a diagram illustrating a subcarrier organization by subbands in which uplink and downlink traffic path subcarriers are allocated throughout the subbands in one example MIMO system employing orthogonal frequency division multiple access (OFDMA) techniques.

Turning to FIG. 2, with continued reference to FIG.1, a diagram is provided that illustrates an example subcarrier organization by subbands. Uplink and downlink traffic path subcarriers are allocated throughout the uplink and downlink subbands in a system employing orthogonal frequency division multiple access (OFDMA) transmission techniques. An UL subcarrier space 200 is shown comprising a plurality of subcarriers grouped according to subbands shown at 230(1) through 230(K). The uplink data subcarriers 162(1)-162(K) that are used for uplink transmission 160 from MS 120(1) to BS 110 are depicted as dashed arrows. Pilot subcarriers 210 are also shown with larger magnitudes than the data subcarriers. For simplicity DC and guard subcarriers are omitted from UL subcarrier space 200.

Downlink subcarrier space 240 is depicted in a manner similar to UL subcarrier space 200 with subcarriers grouped according to subbands 270(1)-270(P). The DL data subcarriers 262(1)-262(P) that are used for DL transmission from BS 110 to MS 120(1) are depicted with dashed arrows. Pilot subcarriers 250 are also shown with larger magnitudes than the data subcarriers and the DC and guard subcarriers are once again omitted from DL subcarrier space 240. It will be appreciated that the arrangement of subcarriers 162(1)-162(K) and 262(1)-(K) in a contiguous fashion is for simplifying the diagrams and the arrangement shown is not intended to be limiting. The subcarriers 162(1)-162(K) and 262(1)-262(K) may be distributed throughout their respective subcarrier spaces in any manner deemed suitable by a system designer, e.g., using sub-channel diversity.

Briefly, the BS 110 uses a wideband multipath DOA analysis and beamforming weight computation process logic to estimate spatial signatures y for signals 160 and/or pilot subcarriers 210 in each individual subband 230(1)-230(K) received at the plurality of antennas 140(1)-140(M). From the spatial signatures y, a spatial decomposition vector u is generated for L distinguishable directions of arrival for transmission signals 160(R1), 160(R2), and 160(D) using a transform (e.g., a fast Fourier transform). In most cases L≧M but for simplicity only three DOAs are shown, one each for transmission signals 160(R1), 160(R2), and 160(D). A signal s is iteratively estimated to best match the spatial decomposition vector u for all K subbands. Signal s may be iteratively estimated using an objective function with L DOAs or an inverse complex number projection with L subsectors may be employed. These estimation techniques, and others like multiple component signal detection and multiple parameter estimation, are known to those skilled in the art and are not meant to be limiting of how the computations may be performed.

From signal s, a direction of departure (DOD) vector v is computed for the subcarriers 262 in the P DL subbands 270(1)-270(P). An inverse fast Fourier transform or matrix inversion technique is then applied to v to obtain beamforming vector x. A subvector $x_p$ is extracted from the first M components of beamforming vector x. Subvector $x_p$ is then normalized to produce the final beamforming weight vector $w_p$. The beamforming weight vector $w_p$ can be used for space-time code (STC) transmissions or MIMO transmissions when applied to a signal stream or multiple signal streams to be transmitted from the first device to the second device.

Figure 3:
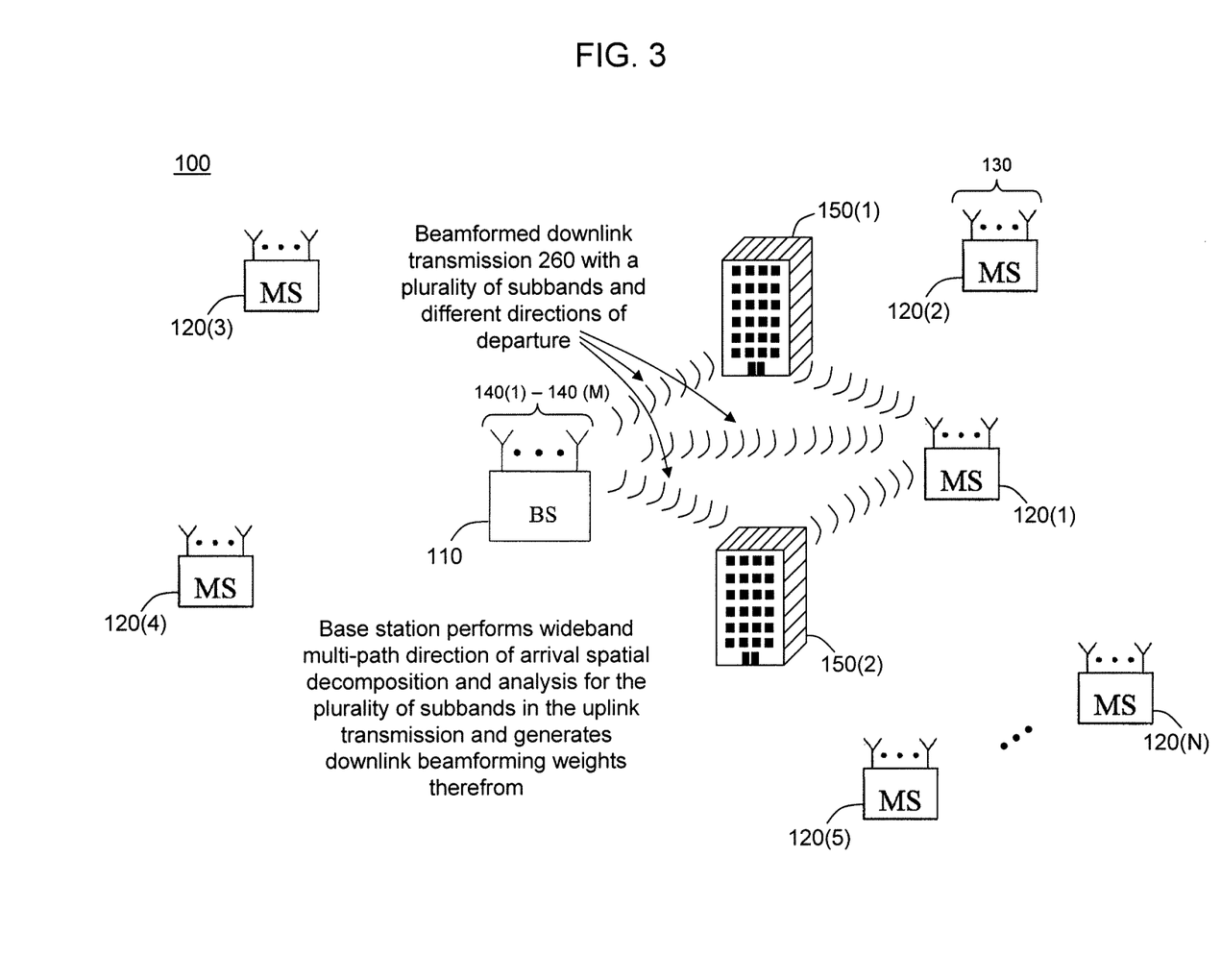
FIG. 3 is a block diagram showing an example of a wireless communication system in which a first communication device transmits a beamformed wideband multipath transmission to a second device.

Turning now to FIG. 3, the wireless radio communication system 100 from FIG. 1 is shown. The beamforming weight vector $w_p$ has been used to beamform DL transmission 260 for transmission via antennas 140(1)-140(M) of BS 110. As can be seen from the figure, DL transmission 260 has three DODs that correspond to the three DOAs of UL transmission 160. The transmission 260 is thereby targeted to MS 120(1) by virtue of a DL multipath signal. The details of the wideband multipath DOA analysis and beamforming weight computation process logic will be discussed below in conjunction with FIG. 5. It should be appreciated that the above techniques may also be employed by the MS 120(1) to beamform transmissions to the BS 110.

Figure 4:
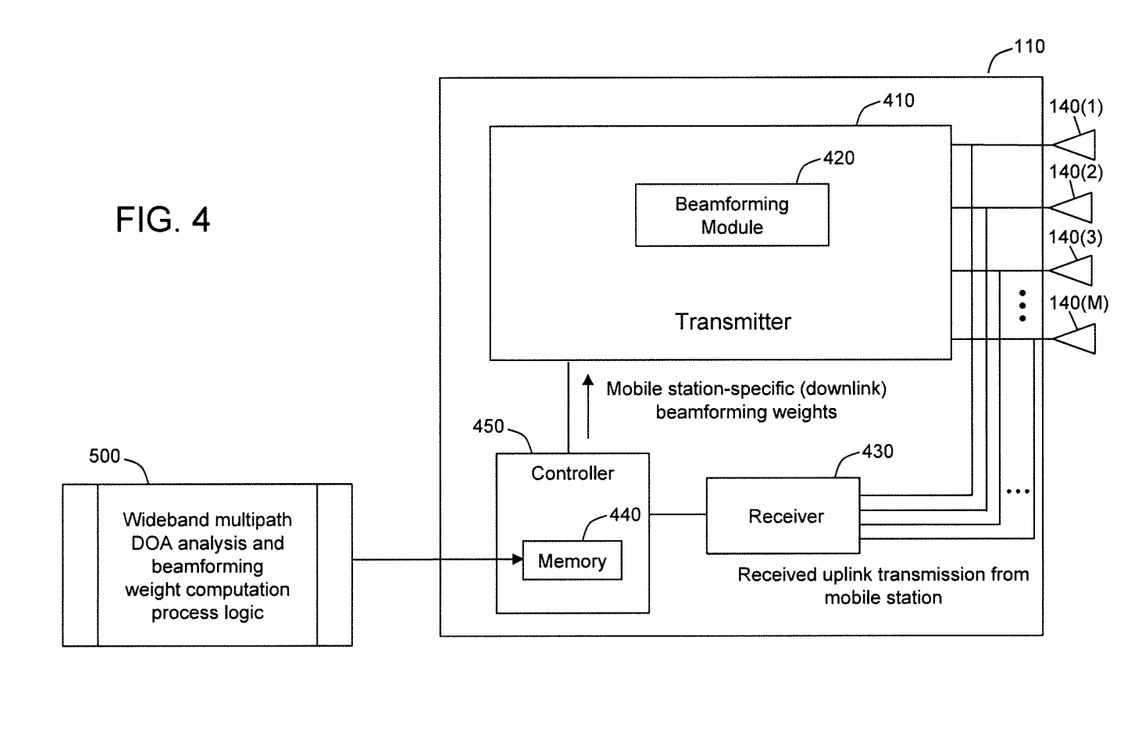
FIG. 4 is an example of a block diagram of a wireless communication device that is configured to compute downlink beamforming weight vectors based on wideband multipath direction of arrival analysis.

Referring next to FIG. 4, an example of a block diagram is shown for a wireless communication device that may serve as a BS 110 and that is configured to execute a wideband multipath DOA analysis and beamforming weight computation process logic 500. The BS 110 comprises a transmitter 410, a receiver 430, and a controller 450. The controller 450 supplies the data to the transmitter 410 to be transmitted and processes signals received by the receiver 430. In addition, the controller 450 performs other transmit and receive control functionality. Parts of the functions of the transmitter 410, receiver 430, and controller 450 may be implemented in a modem and other parts of the transmitter 410 and receiver 430 may be implemented in radio transmitter and radio transceiver circuits. It should be understood that there are analog-to-digital converters (ADCs) and digital-to-analog converters (DACs) in the various signal paths to convert between analog and digital signals.

The transmitter 410 may comprise individual transmitter circuits that supply respective upconverted signals to corresponding ones of a plurality of antennas (antennas 140(1)-140(M)) for transmission. To this end, the transmitter 410 comprises a beamforming module 420 that applies the beamforming weights $w_p$ (supplied to it by the controller 450) to the signal stream(s) to be transmitted via antennas 140(1)-140(M). The receiver 430 receives the signals detected by each of the antennas 140(1)-140(M) and supplies corresponding antenna-specific receive signals to controller 450. It is understood that the receiver 430 may comprise a plurality of receiver circuits, each for a corresponding one of a plurality of antennas. For simplicity, these individual receiver circuits and individual transmitter circuits are not shown.

The controller 450 is a data processing device, e.g., a microprocessor, microcontroller, etc., that comprises a memory 440 or other data storage block that stores data used for the techniques described herein. The memory 440 may be separate or part of the controller 450. Instructions for performing the wideband multipath DOA analysis and beamforming weight computation process logic 500 may be stored in the memory 440 for execution by the controller 450. The process 500 generates the beamforming weights $w_p$ that are supplied to the transmitter 410 for use by the beamforming module 420.

The functions of the controller 450 may be implemented by logic encoded in one or more tangible media (e.g., embedded logic such as an application specific integrated circuit (ASIC), digital signal processor (DSP) instructions, software that is executed by a processor, etc.), wherein the memory 440 stores data used for the computations described herein (and/or to store software or processor instructions that are executed to carry out the computations described herein). Thus, the process 500 may be implemented with fixed logic or programmable logic (e.g., software/computer instructions executed by a processor or field programmable gate array (FPGA)). Moreover, the functions of the beamforming signal module 420 and the wideband multipath DOA analysis and beamforming weight computation process logic 500 may be performed by the same logic component, e.g., the controller 450.

Figure 5:
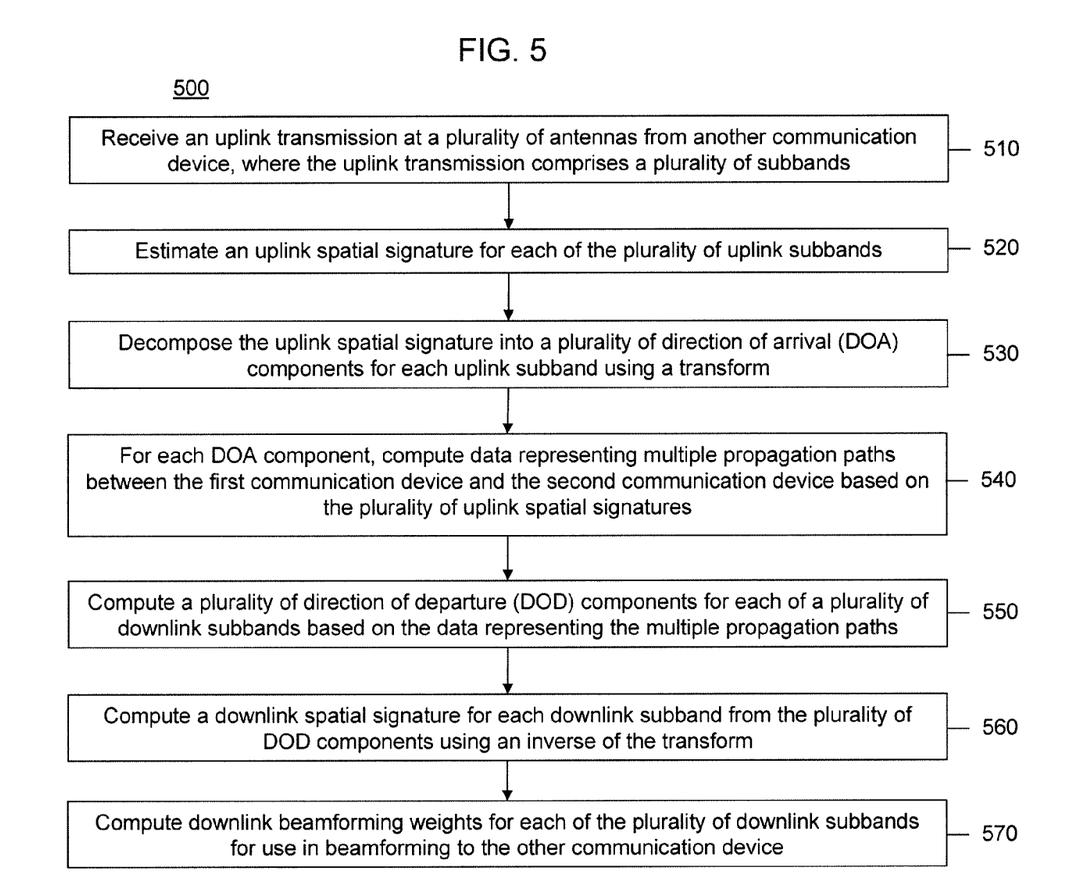
FIG. 5 is a flow chart generally depicting a process for computing downlink beamforming weights based on a transmission received at a base station from a mobile station in a MIMO communication system.

Referring to FIG. 5, the wideband multipath DOA analysis and beamforming weight computation process logic 500 is now described. Reference is also made to FIGS. 2, 3, and 6-8 for purposes of this description. At 510, an uplink transmission is received at a plurality of antennas, e.g., antennas 140(1)-140(M), of a first communication device, e.g., BS 110, from a second communication device, e.g., MS 120(1), where the uplink transmission comprises a plurality of uplink subbands, e.g., subbands 230(1)-230(K). At 520, an uplink spatial signature is estimated for each of the plurality of uplink subbands, e.g., using signal 160 received via traffic subcarriers 162(1)-162(K) and/or pilot subcarriers 210. Estimating the uplink spatial signature, such as the eigenvector of the largest eigenvalue of a corresponding covariance matrix, comprises computing for each subband a vector:

$$[y_1(m_k), y_2(m_k), \ldots, y_M(m_k)]^H \text{ for } k=1, \ldots, K,$$

where y represents the uplink spatial signature, m represents the plurality of uplink subbands, k represents the subband index, K represents the number of the plurality of uplink subbands, M represents the number of the plurality of antennas of the first communication device, and H represents the Hermitian operator. In other words, the BS 110 is configured to estimate the uplink spatial signature by generating a covariance matrix based on signals received at the plurality of antennas, and decompose the uplink spatial signature by computing a singular value decomposition of the covariance matrix (e.g., eigenvalue decomposition). Other singular value decomposition techniques may be used in addition to the eigenvalue decomposition technique described above.

At 530, the uplink spatial signature is decomposed into a plurality of direction of arrival (DOA) components for each uplink subband 230(1)-230(K) using a transform or computational method. In one example, a fast Fourier transform (FFT) is used. The DOA components are computed as:

$$[u_1(m_k), u_2(m_k), \ldots, u_L(m_k)]^H = FFT([y_1(m_k), y_2(m_k), \ldots, y_M(m_k)]^H, L)$$

for k=1, . . . , K, and l=1, . . . , L, where u represents a decomposed spatial signature and L represents a number of distinguishable DOA components.

Figure 6:
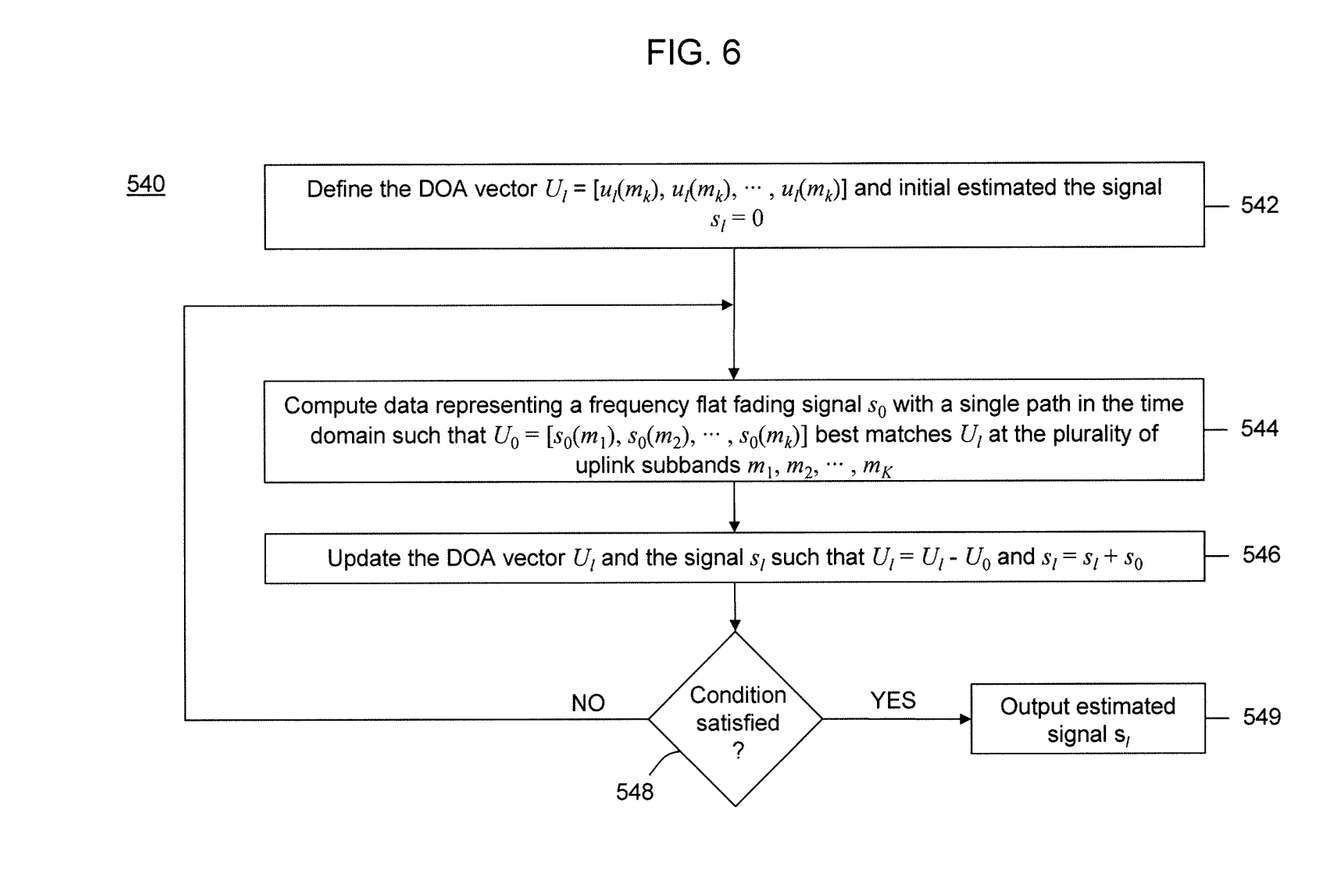
FIG. 6 is a flow chart depicting a process for computing data representing multiple propagation paths by iteratively estimating a signal with multiple paths in the time domain that best matches direction of arrival components at all of the uplink subbands.
Figure 7:
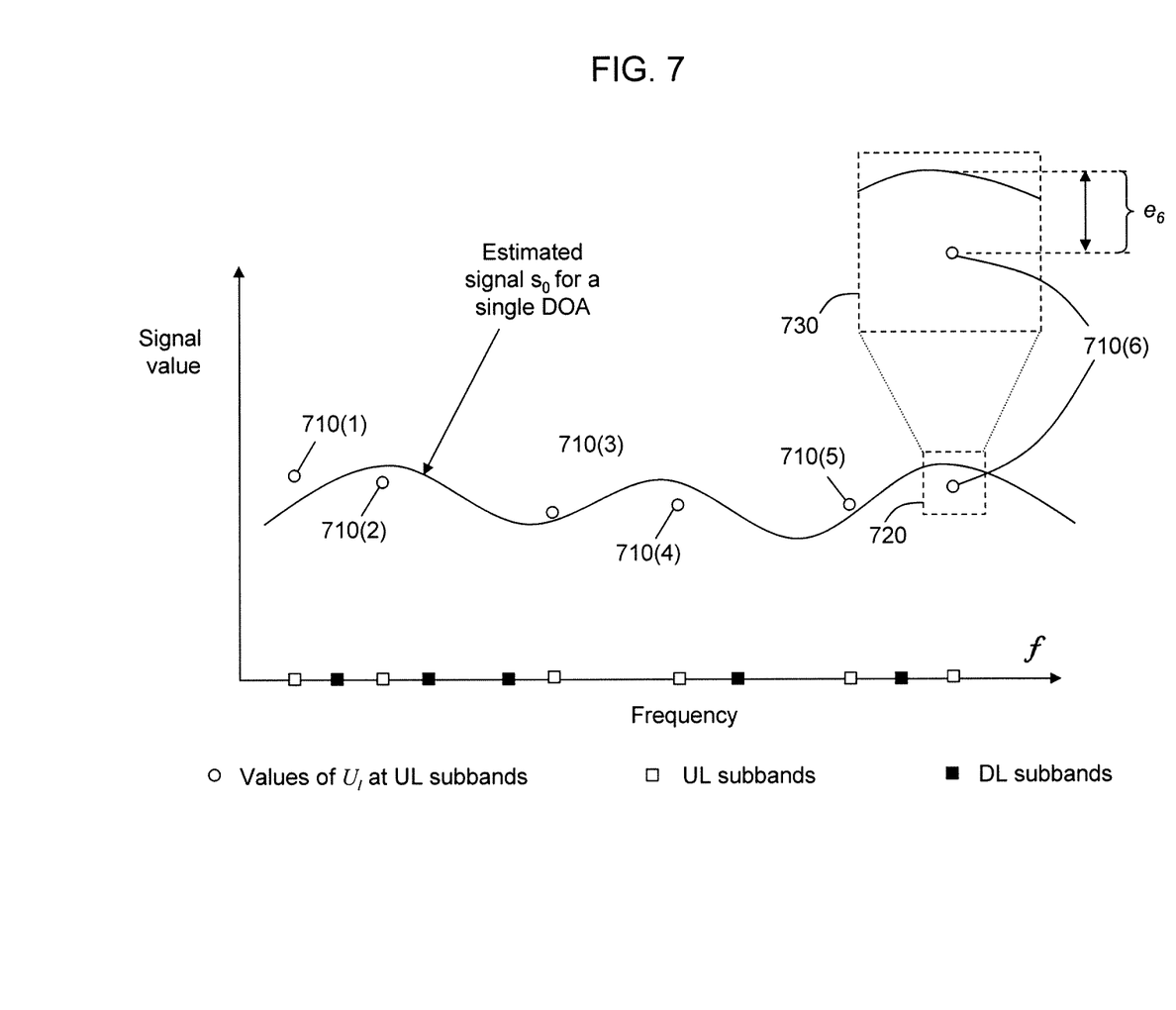
FIG. 7 is an example of an estimated single direction of arrival signal estimated from uplink signal samples at a plurality of uplink subbands.

At 540, data representing multiple propagation paths between the first communication device and the second communication device is computed for each DOA component using signal estimation. More specifically, at function 540, for each DOA component, data representing a virtual frequency selective "channel" is constructed that best matches the components at all the uplink subbands. Turning to FIG. 6, an example implementation of function 540 is described in greater detail. Reference is also made to FIGS. 7 in connection with the description of FIG. 6. The data representing the multiple propagation paths is computed by iteratively estimating a signal $s_l$ (l=1, . . . , L) with multiple paths in the time domain that best matches the DOA components $[u_l(m_1), u_l(m_2), \ldots, u_l(m_k)]$ at all of the uplink subbands $m_1, m_2, \ldots, m_K$, e.g., subbands 230(1)-230(K), for each DOA, l=1, . . . , L. First at 542, an initial DOA vector $U_l$ and the estimated signal $s_l$ are defined and initialized to $U_l=[u_l(m_1),$ $u_l(m_2), \ldots, u_l(m_k)]$; $s_l=0$. At 544, data representing a frequency flat fading signal $s_0$ with a single path in the time domain is computed such that $U_0=[s_0(m_1), s_0(m_2), \ldots, s_0(m_k)]$ best matches $U_l$ at the plurality of uplink subbands $m_1, m_2, \ldots, m_K$.

One example of how so can be estimated for a single DOA is shown in FIG. 7. The estimated signal $s_0$ could be for any one of the DOAs (e.g., 1, . . . , L). A number of data points 710(1)-710(6) representing DOA components from $U_l$ in the frequency domain are shown. These data points are depicted as unfilled (white) circles. The data points 710(1)-710(6) are each shown directly above their corresponding UL subband (depicted as unfilled squares along the frequency axis), e.g., corresponding subcarrier frequencies. DL subbands are depicted as filled black squares along the frequency axis. Height above the frequency axis indicates the corresponding data point value. The shape of the signal so, the vertical placement of the data points 710, the spacing between subbands (UL and DL), and other elements shown are not to scale and are not meant to depict actual signals, but are depicted in this manner for simplicity of explanation.

At 720, a section of the signal space is shown that includes a portion of signal $s_0$ and data point 710(6). An enlarged view of section 720 is shown at 730. At 730, a distance or difference in magnitude is shown as $e_6$ and represents an error signal. Error signals $e_1$-$e_5$ exist for corresponding data points 710(1)-710(5), but are not shown. In one example, the signal $s_0$ can be estimated by minimizing the mathematical mean of the square of the error terms $e_1$-$e_6$ (e.g., a mean least squares method). It will be appreciated that other estimation methods, e.g., method of moments, may be used and employ linear and/or non-linear techniques.

Referring back to FIG. 6, at 546, the DOA vector $U_l$ and signal $s_l$ are updated such that $U_l=U_l-U_0$ and $s_l=s_l+s_0$ (i.e., single path information is subtracted out of $U_l$ while being accumulated in $s_1$). At 548, predetermined conditions are tested. If one or more conditions are satisfied, for example, a maximum number of iterations is met or a power threshold for the residual signal $U_l$ falls below a given value, then at 549 the estimated signal $s_l$ is output. If one or more predetermined conditions are not satisfied, then functions 544 and 546 are repeated, i.e., the data representing a frequency flat fading signal is again computed for the next single path in the time domain, and the DOA vector $U_l$ and signal $s_l$ are again updated. The signal estimation described herein may be implemented using either time domain or frequency domain techniques, although frequency domain techniques are known to be less computationally intensive.

Thus, to summarize function 540, a signal with multiple paths in the time domain is estimated that best matches the DOA components at the plurality of uplink subbands. The estimated signal is iteratively estimated by computing data representing a frequency flat fading signal with a single path in the time domain that best matches the DOA components at the plurality of uplink subbands and subtracting out spatial components that represent the single path from the DOA components while accumulating the data representing the flat fading signal to produce the estimated signal. In one example, estimating a single path time domain signal can be accomplished by searching a set of UL frequencies. At each UL frequency, a frequency flat fading signal is generated. The inner product of the generated signal is computed for the received signal at the UL subbands. The frequency with largest absolute value of the inner product is detected as the frequency corresponding to the frequency flat fading signal, and the inner product value with an appropriate normalization is the amplitude estimation of the frequency flat fading signal.

The inner product generates a Hilbert space and is well-known to those skilled in the art.

Referring back to FIG. 5, at 550 a plurality of direction of departure (DOD) components for each of a plurality of downlink subbands is computed based on the data representing the multiple propagation paths. In one example, the plurality of DOD components $[v_l(n_1), v_l(n_2), \ldots, v_l(n_p)]$ is computed for each downlink subband. The DOD components are based on the estimated signal $s_l$ (l=1, ..., L) such that $[v_l(n_1), v_l(n_2), \ldots, v_l(n_p)]=[s_l(n_1), s_l(n_2), \ldots, s_l(n_p)]$, for each of the plurality of downlink subbands $n_1, n_2, \ldots, n_p$, where v represents the plurality of DOD components and P represents a number of the plurality of downlink subbands.

Figure 8:
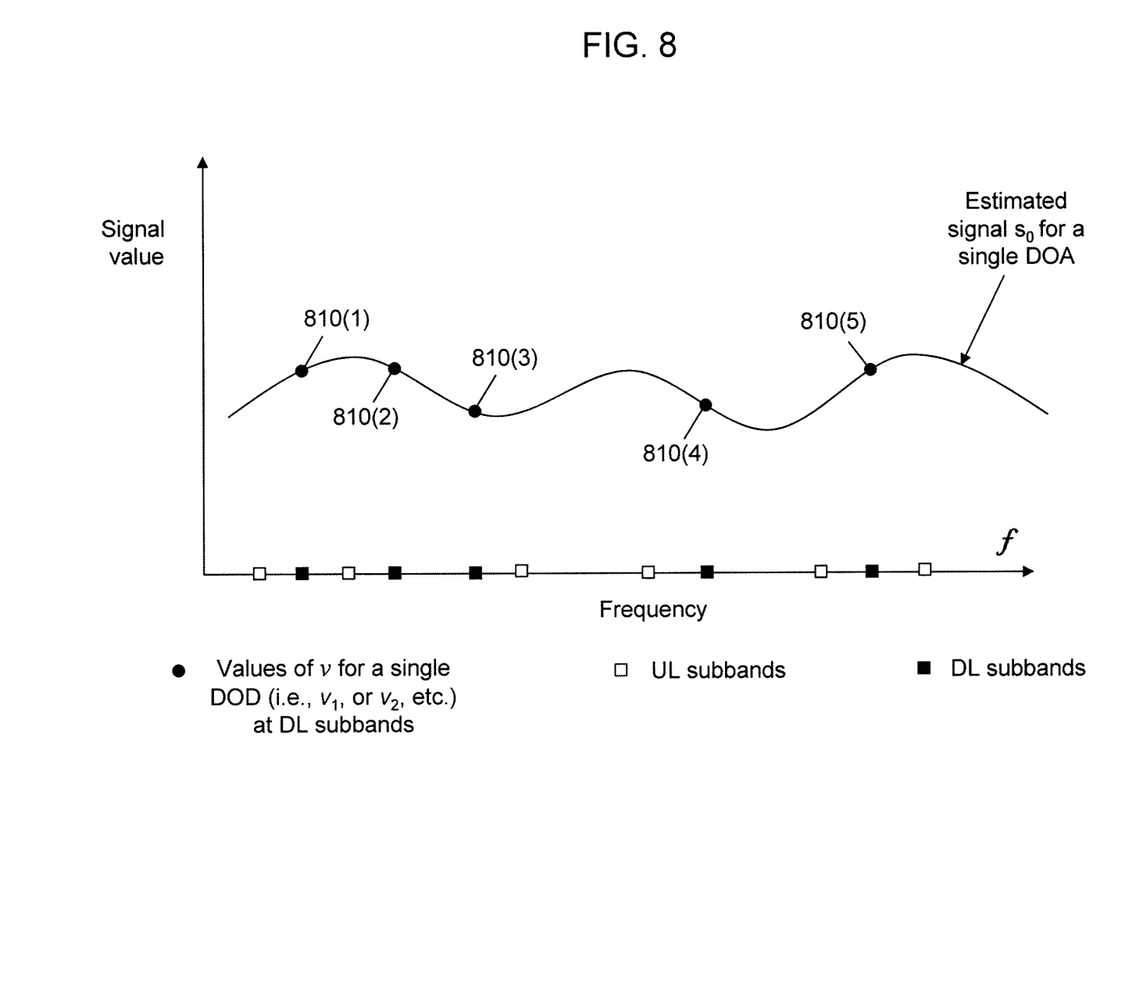
FIG. 8 is an example of estimated downlink direction of departure vector components for a single direction of departure selected from an estimated single direction of arrival signal.

One example of how one element of $v_l$ (e.g., $v_1$, or $v_2$, or $v_3$, etc.) may be computed for each downlink subband is shown in FIG. 8. In FIG. 8, the estimated signal $s_0$, the UL subbands, and the DL subbands from FIG. 7 are shown (for the single DOA). Due to the frequency mismatch of DL subbands and the UL subbands, the UL channel spatial signatures cannot be directly applied to DL beamforming estimation. However, because of the techniques described herein for signal estimation, the signal s, is continuous or continuous over region of the frequency band. As depicted, estimated signal so comprises components that overlap the DL subbands. Therefore, corresponding downlink data points 810(1)-810(5) may be computed from estimated signal $s_0$. The data points 810(1)-810(5) lie on or near estimated signal $s_0$ and are directly above the corresponding DL subband. Thus, the data points 810(1)-810(5) may be used to compute one element of $v_l$ (e.g., $v_1$, or $v_2$, or $v_3$, etc.) that represents a single DOD for beamforming that is already frequency compensated for the UL/DL frequency mismatch. The number of UL subbands and DL subbands used for the techniques described herein do not have to be equal, and like FIG. 7, FIG. 8 is not to scale.

Referring back to FIG. 5, the DL subchannel spatial signature is calculated from the UL sub-channel spatial signatures. At 560, a downlink spatial signature is computed for each downlink subband from the plurality of DOD components using an inverse of the transform used at 530. The downlink spatial signature is computed from the DOD components $[v_l(n_1), v_l(n_2), \ldots, v_l(n_p)]$. The downlink spatial signatures represented as $[x_1(n_p), x_2(n_p), \ldots, x_L(n_p)]^H$ for the downlink subbands $n_1, n_2, \ldots, n_p$ are computed such that $[x_1(n_p), x_2(n_p), \ldots, x_L(n_p)]^H = \text{IFFT}([v_1(n_p), v_2(n_p), \ldots, v_L(n_p)]^H, L)$, p=1, ..., P, where x represents the downlink spatial signature, and IFFT is an inverse fast Fourier transform. A subvector $x_p = [x_1(n_p), x_2(n_p), \ldots, x_L(n_p)]^H$ is generated from the first M components of the downlink spatial signature $[x_1(n_p), x_2(n_p), \ldots, x_L(n_p)]^H$, where $x_p$ represents a spatial signature at the $p^{th}$ downlink subband.

At 570, downlink beamforming weights are computed for each of the plurality of downlink subbands based on the downlink spatial signature, where the downlink beamforming weights are for use by the first communication device when beamforming a downlink transmission (i.e., one or more signal streams) via the plurality of antennas of the first communication device to the second communication device. A downlink beamforming weight vector $w_p$ is computed for downlink subband p from the subvector $x_p$ such that $w_p = x_p / \text{norm}(x_p)$, p=1, ..., P, where norm( ) is the Euclidean norm operation.

Techniques are disclosed herein to generate values for beamforming weights that a first communication device uses for wireless transmissions to a second communication device. The first communication device computes the beamforming weights based on the uplink channel information from signals received from the second communication device using wideband multipath DOA spatial decomposition and analysis for the plurality of subbands in the signal. The techniques described herein improve the signal-to-noise ratio (SNR) and reduce the data transmission error.

Although the apparatus, system, and method are illustrated and described herein as embodied in one or more specific examples, it is nevertheless not intended to be limited to the details shown, since various modifications and structural changes may be made therein without departing from the scope of the apparatus, system, and method, and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   at a first communication device, receiving an uplink transmission at a plurality of antennas from a second communication device, wherein the uplink transmission comprises a plurality of uplink subbands;
   estimating an uplink spatial signature for each of the plurality of uplink subbands;
   determining a plurality of direction of arrival (DOA) components for each uplink subband from the uplink spatial signature;
   computing data representing a frequency-selective channel encompassing the plurality of uplink subbands between the first communication device and the second communication device that best matches the DOA components across the plurality of uplink subbands, the frequency-selective channel being represented by a set of continuous signal curves $s_l$ that best matches the respective DOA components $u_l$ (l=1, ..., L) for each uplink subband, where L is the number of DOA components;
   computing a plurality of direction of departure (DOD) components for each of a plurality of downlink subbands based on the data representing the frequency-selective channel, the downlink subbands occupying a common communication spectral region with the uplink subbands;
   computing a downlink spatial signature for each downlink subband from the plurality of DOD components; and
   computing downlink beamforming weights for each of the plurality of downlink subbands based on the downlink spatial signature for beamforming a downlink transmission comprising the plurality of downlink subbands to the second device via the plurality of antennas of the first communication device.

2. The method of claim 1, wherein computing the data comprises computing data representing a set of continuous signal curves $s_l$ (l=1, ..., L) that best matches the DOA components $u_l$ (l=1, ..., L) for each uplink subband; and wherein computing the DOD components comprises obtaining the DOD components for each of the plurality of downlink subbands from the data representing the continuous signal curves $s_l$.

3. The method of claim 2, wherein computing the data representing the frequency-selective channel comprises iteratively estimating the signal curves $s_l$ (l=1, ..., L) with the multiple paths in the time domain that best matches to match the l-th DOA components $[u_l(m_l), u_l(m_2), \ldots, u_l(m_k)]$ at all the uplink subbands $m_1, m_2, \ldots, m_K$.

4. The method of claim 3, wherein iteratively estimating comprises setting an initial DOA vector $U_l = [u_l(m_1), u_l(m_2), \ldots, u_l(m_k)]$ and signal curve $s_l = 0$, computing data representing the single path frequency flat fading signal curve $s_0$ such that $U_0 = [s_0(m_1), s_0(m_2), \ldots, s_0(m_k)]$ best matches $U_l$ at the plurality of uplink subbands $m_1, m_2, \ldots, m_K$, updating $U_l = U_l - U_0$, $s_l = s_l + s_0$, repeating computing the data representing the frequency-selective channel and updating until a predetermined condition is satisfied, and providing a final estimated signal curve $s_l$ when the predetermined condition is satisfied.

5. The method of claim 4, wherein the predetermined condition is a maximum number of iterations.

6. The method of claim 4, wherein the predetermined condition is a power of the vector $U_l$.

7. The method of claim 4, wherein computing the plurality of DOD components comprises computing for each downlink subband, DOD components $[v_l(n_1), v_l(n_2), \ldots, v_l(n_p)]$ based on each final estimated signal curve $s_l$ such that $[v_l(n_1), v_l(n_2), \ldots, v_l(n_p)] = [s_l(n_1), s_l(n_2), \ldots, s_l(n_p)]$, for each of the plurality of downlink subbands $n_1, n_2, \ldots, n_p$, where v represents the plurality of DOD components and P represents a number of the plurality of downlink subbands.

8. The method of claim 7, wherein computing the downlink spatial signature comprises computing, from the DOD components $[v_l(n_1), v_l(n_2), \ldots, v_l(n_p)]$, downlink spatial signatures $[x_1(n_p), x_2(n_p), \ldots, x_L(n_p)]^H$ at the downlink subbands $n_1, n_2, \ldots, n_p$ such that $[x_1(n_p), x_2(n_p), \ldots, x_L(n_p)]^H = \text{IFFT}([v_1(n_p), v_2(n_p), \ldots, v_L(n_p)]^H, L)$, $p=1, \ldots, P$, where x represents the downlink spatial signature, and IFFT is an inverse fast Fourier transform, and generating a subvector $x_p = [x_1(n_p), x_2(n_p), \ldots, x_M(n_p)]^H$ from the first M components of the downlink spatial signatures $[x_1(n_p), x_2(n_p), \ldots, x_L(n_p)]^H$, where $x_p$ represents a spatial signature at the $p^{th}$ downlink subband.

9. The method of claim 8, wherein computing the downlink beamforming weights comprises computing a downlink beamforming weight vector $w_p$ for downlink subband p from the subvector $x_p$ such that $w_p = x_p/\text{norm}(x_p)$, $p=1, \ldots, P$, where norm( ) is the Euclidean norm operation.

10. An apparatus comprising:
a plurality of antennas;
a receiver that is configured to process a signal received at the plurality of antennas, wherein the signal comprises a plurality of subbands and was transmitted by a second communication apparatus;
a controller coupled to the receiver, wherein the controller is configured to:
estimate an uplink spatial signature for each of the plurality of uplink subbands;
determine a plurality of direction of arrival (DOA) components for each uplink subband from the uplink spatial signature;
compute data representing a frequency-selective channel encompassing the plurality of uplink subbands between the first communication device and the second communication device that best matches the DOA components across the plurality of uplink subbands, the frequency-selective channel being represented by a set of continuous signal curves $s_l$ that best matches the respective DOA components $u_l$ ($l=1, \ldots, L$) for each uplink subband, where L is the number of DOA components;
compute a plurality of direction of departure (DOD) components for each of a plurality of downlink subbands based on the data representing the frequency-selective channel, the downlink subbands occupying a common communication spectral region with the uplink subbands;
compute a downlink spatial signature for each downlink subband from the plurality of DOD components; and
compute downlink beamforming weights for each of the plurality of downlink subbands based on the downlink spatial signature; and a transmitter coupled to the controller, wherein the transmitter is configured to apply the beamforming weights to a downlink transmission to the second communication apparatus via the plurality of antennas.

11. The apparatus of claim 10, wherein the controller is configured to estimate the uplink spatial signature by generating a covariance matrix based on signals received at the plurality of antennas, and decompose the uplink spatial signature by computing a singular value decomposition of the covariance matrix.

12. The apparatus of claim 10, wherein the controller is configured to compute the data representing the signal curves by iteratively estimating each of the signal curves until a predetermined condition is satisfied.

13. The apparatus of claim 12, wherein the controller is configured to iteratively estimate by computing data representing a single path frequency flat fading signal curve that best matches the DOA components at the plurality of uplink subbands and subtracting out spatial components that represent the single path from the DOA components while accumulating the data representing the flat fading signal to produce the estimated signal.

14. The apparatus of claim 13, wherein the controller is configured to compute the plurality of DOD components by obtaining, for each downlink subband, DOD components from the data representing the continuous signal curves $s_l$.

15. A non-transitory computer-readable medium storing instructions that, when executed by a computer, cause the computer to:
at a first communication device, receive an uplink transmission at a plurality of antennas from a second communication device, wherein the uplink transmission comprises a plurality of uplink subbands;
estimate an uplink spatial signature for each of the plurality of uplink subbands;
determine a plurality of direction of arrival (DOA) components for each uplink subband from the uplink spatial signature;
compute data representing a frequency-selective channel encompassing the plurality of uplink subbands between the first communication device and the second communication device that best matches the DOA components across the plurality of uplink subbands, the frequency-selective channel being represented by a set of continuous signal curves $s_l$ that best matches the respective DOA components $u_l$ ($l=1, \ldots, L$) for each uplink subband, where L is the number of DOA components;
compute a plurality of direction of departure (DOD) components for each of a plurality of downlink subbands based on the data representing the frequency-selective channel, the downlink subbands occupying a common communication spectral region with the uplink subbands;
compute a downlink spatial signature for each downlink subband from the plurality of DOD components; and
compute downlink beamforming weights for each of the plurality of downlink subbands based on the downlink spatial signature for beamforming a downlink transmission comprising the plurality of downlink subbands to the second device via the plurality of antennas of the first communication device.

16. The non-transitory computer readable medium of claim 15, wherein the instructions that estimates the uplink spatial signature comprises instructions configured to generate a covariance matrix, and wherein the instructions that decomposes the uplink spatial signature comprises instructions configured to perform singular value decomposition of the covariance matrix.

17. The non-transitory computer readable medium of claim 15, wherein the instructions that computes the data representing the frequency-selective channel comprises instructions configured to iteratively estimate the signal curves until a predetermined condition is satisfied.

18. The non-transitory computer readable medium of claim 17, wherein the instructions that iteratively estimates comprises instructions configured to compute data representing a single path frequency flat fading signal curve that best matches the DOA components at the plurality of uplink subbands and subtract out spatial components that represent the single path from the DOA components and accumulate the data representing the flat fading signal to produce the estimated signal curve.

19. The non-transitory computer readable medium of claim 18, wherein the instructions that computes the plurality of DOD components comprises instructions configured to obtain for each downlink subband, the DOD components from the data representing the continuous signal curves $s_l$.

* * * * *